United States Patent
Kaji et al.

(10) Patent No.: US 10,794,456 B2
(45) Date of Patent: Oct. 6, 2020

(54) CONTINUOUSLY VARIABLE TRANSMISSION INCLUDING A PRIMARY PULLEY, A SECONDARY PULLEY, A METAL TRANSMISSION BELT, AND A MOVING APPARATUS

(71) Applicant: TOYOTA JIDOSHA KABUSHIKI KAISHA, Toyota-shi, Aichi-ken (JP)

(72) Inventors: Fumiya Kaji, Susono (JP); Hideaki Takahara, Toyota (JP); Keisuke Ninomiya, Susono (JP); Kazunori Harima, Susono (JP); Yu Inase, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 311 days.

(21) Appl. No.: 15/822,960

(22) Filed: Nov. 27, 2017

(65) Prior Publication Data

US 2018/0163827 A1 Jun. 14, 2018

(30) Foreign Application Priority Data

Dec. 13, 2016 (JP) ................................. 2016-241620

(51) Int. Cl.
*F16H 9/16* (2006.01)
*F16H 55/52* (2006.01)
(Continued)

(52) U.S. Cl.
CPC ............... *F16H 9/16* (2013.01); *F16H 9/12* (2013.01); *F16H 9/125* (2013.01); *F16H 9/18* (2013.01); *F16H 9/24* (2013.01); *F16H 55/52* (2013.01)

(58) Field of Classification Search
CPC .................................. F16H 9/125; F16H 55/52
See application file for complete search history.

(56) References Cited

U.S. PATENT DOCUMENTS 4,381,174 A * 4/1983 Obler ...................... F16H 9/14
417/15
4,648,854 A * 3/1987 Redington ............... F16H 7/14
474/114

(Continued)

FOREIGN PATENT DOCUMENTS

JP 02036647 U 3/1990
JP 2002161953 A 6/2002
(Continued)

OTHER PUBLICATIONS

JP2002161953 Translation.*

*Primary Examiner* — Minh Truong
(74) *Attorney, Agent, or Firm* — Hunton Andrews Kurth LLP

(57) ABSTRACT

A continuously variable transmission is configured such that a transmission ratio continuously changes by continuously changing widths of belt winding grooves of a primary pulley and a secondary pulley, and includes: the primary pulley including a first fixed sheave and a first moving sheave provided in a primary shaft; the secondary pulley including a second fixed sheave and a second moving sheave provided in a secondary shaft; a metal transmission belt wound around the primary pulley and the secondary pulley; and a moving apparatus configured to integrally move the secondary shaft and a secondary bearing supporting the secondary shaft such that a relative positional relationship between the first fixed sheave and the second fixed sheave changes.

5 Claims, 6 Drawing Sheets

(51) Int. Cl.
  *F16H 9/12*  (2006.01)
  *F16H 9/24*  (2006.01)
  *F16H 9/18*  (2006.01)

(56) References Cited

U.S. PATENT DOCUMENTS 9,279,475 B2 * 3/2016 Sumida .................... F16H 9/18
2014/0235381 A1 8/2014 Yagasaki

FOREIGN PATENT DOCUMENTS

JP   2012-127510 A   7/2012
WO   2013046367 A1   4/2013

* cited by examiner

CONTINUOUSLY VARIABLE TRANSMISSION INCLUDING A PRIMARY PULLEY, A SECONDARY PULLEY, A METAL TRANSMISSION BELT, AND A MOVING APPARATUS

INCORPORATION BY REFERENCE

The disclosure of Japanese Patent Application No. 2016-241620 filed on Dec. 13, 2016 including the specification, drawings and abstract is incorporated herein by reference in its entirety.

BACKGROUND

1. Technical Field

The present disclosure relates to a continuously variable transmission.

2. Description of Related Art

A belt-type continuously variable transmission includes a variable pulley and a belt. Japanese Patent Application Publication No. 2012-127510 (JP 2012-127510 A) describes that, in a belt-type continuously variable transmission configured such that a belt is wound around a pair of variable pulleys, an angular difference is provided between a rotating shaft of a primary pulley and a rotating shaft of a secondary pulley, so as to restrain misalignment of the belt.

SUMMARY

However, in the configuration described in JP 2012-127510 A, a direction of an element is changed due to a frictional force generated between the element and a ring, which constitute the belt. As a result, a stress concentrates on a contact part between the elements, which might decrease durability and increase power loss.

The present disclosure restrains misalignment of a belt and restrains a decrease of durability and an increase of power loss.

A first aspect of the present disclosure is a continuously variable transmission. The continuously variable transmission includes a primary pulley, a secondary pulley, a metal transmission belt, and a moving apparatus. The primary pulley includes a first fixed sheave fixed to a primary shaft, and a first moving sheave rotating together with the primary shaft in an integrated manner and relatively movable in an axial direction. The secondary pulley includes a second fixed sheave fixed to a secondary shaft, and a second moving sheave rotating together with the secondary shaft in an integrated manner and relatively movable in the axial direction. The transmission belt is wound around the primary pulley and the secondary pulley. The metal transmission belt is configured to continuously change a transmission ratio by continuously changing a width of a belt winding groove of the primary pulley and a width of a belt winding groove of the secondary pulley. The moving apparatus is configured to integrally move either the primary shaft and a primary bearing supporting the primary shaft or the secondary shaft and a secondary bearing supporting the secondary shaft such that a relative positional relationship between the first fixed sheave and the second fixed sheave changes. The moving apparatus is configured to change the relative positional relationship such that a misalignment amount of the transmission belt is reduced.

With the above configuration, the moving apparatus can integrally move either the primary shaft and the primary bearing or the secondary shaft and the secondary bearing such that the relative positional relationship between the fixed sheave of the primary pulley and the fixed sheave of the secondary pulley changes. Hereby, it is possible to change a shaft-to-shaft distance between the primary shaft and the secondary shaft, or a sheave-surface-to-sheave-surface distance between the fixed sheaves of the pulleys, so as to reduce a misalignment amount of the transmission belt. This makes it possible to reduce the misalignment amount of the transmission belt, thereby making it possible to restrain the misalignment of the transmission belt and to restrain a decrease of durability and an increase of power loss.

In the continuously variable transmission, the relative positional relationship may be determined by a shaft-to-shaft distance between the primary shaft and the secondary shaft. When the moving apparatus integrally moves the secondary bearing and the secondary shaft, the moving apparatus may be configured to move the secondary bearing and the secondary shaft in an orthogonal direction to the axial direction of the secondary shaft by giving a force in the orthogonal direction to the secondary bearing such that the shaft-to-shaft distance changes.

With the above configuration, the moving apparatus can move the secondary shaft in the direction orthogonal to the axial direction. Hereby, it is possible to change the shaft-to-shaft distance between the primary shaft and the secondary shaft, so as to reduce the misalignment amount of the transmission belt.

The continuously variable transmission may further include a drive gear configured to rotate together with the secondary shaft in an integrated manner, and a driven gear meshing with the drive gear. When the moving apparatus integrally moves the secondary bearing and the secondary shaft, the moving apparatus may be configured to move the secondary bearing and the secondary shaft to reciprocate with a predetermined arc on a circular orbit around a rotation center of the driven gear such that a position of a rotation center of the secondary shaft is displaced on the circular orbit. A radius of the circular orbit may be equal to a sum of a pitch radius of the drive gear and a pitch radius of the driven gear.

With the above configuration, it is possible to move the secondary shaft such that the position of the rotation center of the secondary shaft is displaced on the circular orbit around the rotation center of the driven gear. Hereby, at the time when the secondary shaft moves, it is possible to restrain an increase of a meshing error in a meshing portion between the drive gear and the driven gear. Accordingly, it is possible to restrain the misalignment of the transmission belt and to restrain the decrease of durability of the transmission belt and the increase of power loss.

In the continuously variable transmission, the secondary bearing may be a rolling bearing having an outer race that is in a shape along the predetermined arc. The moving apparatus may include a cage. The cage may be a fixed member having a hollow shape along the predetermined arc, and may accommodate the outer race inside the hollow in a movable state on the circular orbit.

With the above configuration, the arc-shaped hollow shape of the cage of the moving apparatus allows the secondary bearing accommodated inside the cage to move in a direction along the predetermined arc on the circular orbit. This can restrain the position of the rotation center of the secondary shaft from deviating from the circular orbit. Hereby, it is possible to restrain the increase of the meshing error in the meshing portion between the drive gear and the driven gear and to restrain the increase of power loss.

In the continuously variable transmission, the relative positional relationship may be determined by a sheave-surface-to-sheave-surface distance between a sheave surface of the first fixed sheave and a sheave surface of the second fixed sheave. When the moving apparatus integrally moves the primary bearing and the primary shaft, the moving apparatus may be configured to move the primary bearing and the primary shaft in the axial direction of the primary shaft by giving a force in the axial direction to the primary bearing such that the sheave-surface-to-sheave-surface distance changes.

With the above configuration, the moving apparatus can move the primary shaft in the axial direction. Accordingly, it is possible to change the sheave-surface-to-sheave-surface distance between the first fixed sheave of the primary pulley and the second fixed sheave of the secondary pulley, so as to reduce the misalignment amount of the transmission belt.

With the above configuration, it is possible to change the relative positional relationship between the first fixed sheave of the primary pulley and the second fixed sheave of the secondary pulley by the moving apparatus. This changes the shaft-to-shaft distance between the primary shaft and the secondary shaft, or the sheave-surface-to-sheave-surface distance between the fixed sheaves, thereby making it possible to reduce the misalignment amount of the transmission belt. Accordingly, it is possible to restrain the misalignment of the transmission belt and to restrain the decrease of durability of the transmission belt and the increase of power loss.

In the continuously variable transmission, the moving apparatus may include a hydraulic actuator. The moving apparatus may be configured to integrally move either the primary shaft and the primary bearing supporting the primary shaft or the secondary shaft and the secondary bearing supporting the secondary shaft when a hydraulic pressure of the hydraulic actuator reaches a hydraulic pressure corresponding to the transmission ratio.

In the continuously variable transmission, the moving apparatus may include a feed screw and a driving device. The moving apparatus may be configured to integrally move the secondary shaft and the secondary bearing supporting the secondary shaft when a power of the driving device is transmitted to the feed screw.

In the continuously variable transmission, the moving apparatus may be configured to integrally move either the primary shaft and the primary bearing supporting the primary shaft or the secondary shaft and the secondary bearing supporting the secondary shaft when the transmission ratio is changed.

A second aspect of the present disclosure is a continuously variable transmission. The continuously variable transmission includes a primary pulley, a secondary pulley, a metal transmission belt, and a moving apparatus. The primary pulley includes a first fixed sheave fixed to a primary shaft, and a first moving sheave rotating together with the primary shaft in an integrated manner and relatively movable in an axial direction. The secondary pulley includes a second fixed sheave fixed to the secondary shaft, and a second moving sheave rotating together with the secondary shaft in an integrated manner and relatively movable in the axial direction. The transmission belt is wound around the primary pulley and the secondary pulley. The metal transmission belt is configured to continuously change a transmission ratio by continuously changing a width of a belt winding groove of the primary pulley and a width of a belt winding groove of the secondary pulley. The moving apparatus is configured to integrally move at least one of a first member supporting the primary shaft and a second member supporting the secondary shaft such that a relative positional relationship between the first fixed sheave and the second fixed sheave changes. The first member is the primary shaft and a primary bearing. The second member is the secondary shaft and a secondary bearing. The moving apparatus is configured to change the relative positional relationship such that a misalignment amount of the transmission belt is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A belt-type continuously variable transmission in an embodiment of the present disclosure will be described more specifically with reference to the drawings.

Figure 1:
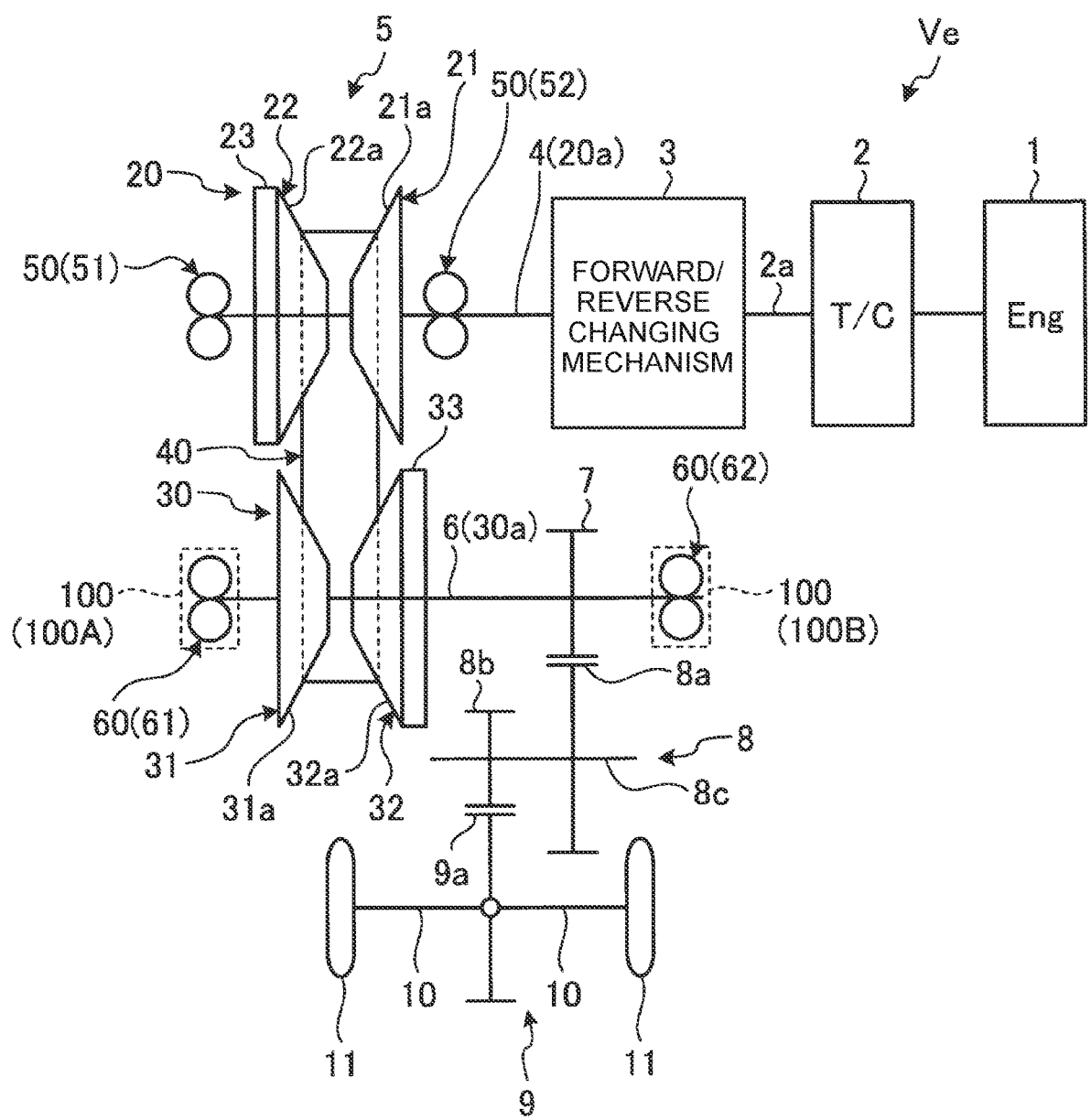
FIG. 1 is a skeleton diagram schematically illustrating a power transmission mechanism of a vehicle provided with a belt-type continuously variable transmission.

FIG. 1 is a skeleton diagram schematically illustrating a power transmission mechanism of a vehicle provided with the belt-type continuously variable transmission. As illustrated in FIG. 1, a vehicle Ve includes an engine (Eng) 1 as a power source. A power output from the engine 1 is input into a belt-type continuously variable transmission (hereinafter just referred to as "CVT") 5 via a torque converter (T/C) 2, a forward/reverse changing mechanism 3, and an input shaft 4, and then transmitted from the CVT 5 to a counter gear mechanism (a reduction gear) 8, a differential mechanism 9, axles 10, and driving wheels 11 via an output shaft 6 and an output gear 7.

The torque converter 2 is connected to the forward/reverse changing mechanism 3 via a turbine shaft 2a in a power transmittable manner. The forward/reverse changing mechanism 3 is a mechanism configured to selectively change a rotation direction of the input shaft 4 between the same direction as a rotation direction of the turbine shaft 2a and an opposite direction to the rotation direction of the turbine shaft 2a. For example, the forward/reverse changing mechanism 3 is constituted by a planetary gear mechanism and a plurality of engaging devices. The forward/reverse changing mechanism 3 is connected to the CVT 5 via the input shaft 4 in a power transmittable manner.

The CVT 5 includes a primary pulley 20, which is a first variable pulley, a secondary pulley 30, which is a second variable pulley, and a transmission belt (hereinafter just referred to as a "belt") 40 wound around belt winding grooves formed in the pulleys 20, 30. The primary pulley 20 rotates together with the input shaft 4 in an integrated manner. The secondary pulley 30 rotates together with the output shaft 6 in an integrated manner. In the example illustrated in FIG. 1, a primary shaft 20*a*, which is a rotating shaft of the primary pulley 20, is constituted by the input shaft 4. Further, a secondary shaft 30*a*, which is a rotating shaft of the secondary pulley 30, is constituted by the output shaft 6.

The primary pulley 20 includes a fixed sheave 21 fixed to the primary shaft 20*a*, a moving sheave 22, which can relatively move in an axial direction on the primary shaft 20*a*, and a first hydraulic chamber 23 configured to give a thrust to the moving sheave 22. Since the moving sheave 22 is splined to the primary shaft 20*a*, the moving sheave 22 rotates together with the primary shaft 20*a* in an integrated manner. The belt winding groove (hereinafter referred to as a "V-groove") of the primary pulley 20 is constituted by a sheave surface 21*a* of the fixed sheave 21 and a sheave surface 22*a* of the moving sheave 22. Further, the first hydraulic chamber 23 is placed on a back-face side (a side opposite to the sheave surface 22*a*) of the moving sheave 22, and generates a force (thrust) to press the moving sheave 22 in the axial direction toward the fixed sheave 21 side by a hydraulic pressure. The moving sheave 22 moves in the axial direction due to the thrust, so that a width of the V-groove of the primary pulley 20 changes.

Further, the primary shaft 20*a* and the primary pulley 20 are rotatably supported by a primary bearing 50 with respect to a case (not shown). The primary bearing 50 is a rolling bearing, and includes a pair of primary bearings 51, 52 placed on both sides of the primary pulley 20 in the axial direction. Respective inner races of the primary bearings 51, 52 are attached to the primary shaft 20*a*, and respective outer races thereof are attached to the case. One primary bearing 51 is placed on an opposite side to the forward/reverse changing mechanism 3 across the primary pulley 20 in the axial direction. The other primary bearing 52 is placed between the primary pulley 20 and the forward/reverse changing mechanism 3 in the axial direction.

The secondary pulley 30 includes a fixed sheave 31 fixed to the secondary shaft 30*a*, a moving sheave 32, which can relatively move in the axial direction on the secondary shaft 30*a*, and a second hydraulic chamber 33 configured to give a thrust to the moving sheave 32. Since the moving sheave 32 is splined to the secondary shaft 30*a*, the moving sheave 32 rotates together with the secondary shaft 30*a* in an integrated manner. The V-groove of the secondary pulley 30 is constituted by a sheave surface 31*a* of the fixed sheave 31 and a sheave surface 32*a* of the moving sheave 32. Further, the second hydraulic chamber 33 is placed on a back-face side of the moving sheave 32, and generates a force (thrust) to press the moving sheave 32 in the axial direction toward the fixed sheave 31 side by the hydraulic pressure. The moving sheave 32 moves in the axial direction due to the thrust, so that a width of the V-groove of the secondary pulley 30 changes.

Further, the secondary shaft 30*a* and the secondary pulley 30 are rotatably supported by a secondary bearing 60 with respect to the case. The secondary bearing 60 is a rolling bearing, and includes a pair of secondary bearings 61, 62 placed in both ends of the secondary shaft 30*a* on both sides of the secondary pulley 30 in the axial direction. Respective inner races of the secondary bearings 61, 62 are attached to the secondary shaft 30*a*, and respective outer races 60*a* (illustrated in FIG. 5 and so on) thereof are attached to the case. One secondary bearing 61 is placed on a side opposite to the output gear 7 across the secondary pulley 30 in the axial direction. The other secondary bearing 62 is placed on a side opposite to the secondary pulley 30 across the output gear 7 in the axial direction.

The belt 40 is an endless metal belt, and its belt length (overall length) is unchangeable. For example, the belt 40 is constituted by a belt (a so-called steel band belt) configured such that a plurality of iron and steel elements is attached to two metal rings, or a chain belt configured such that a plurality of metal plates (links) is connected by a plurality of pins in an annular shape. In a case where the belt 40 is a steel band belt, both ends of the elements are sandwiched by the V-grooves of the pulleys 20, 30, so as to generate frictional forces between the sheave surfaces 21*a*, 22*a*, 31*a*, 32*a*. In a case where the belt 40 is a chain belt, both ends of the pins are sandwiched by the V-grooves of the pulleys 20, 30, so as to generate frictional forces between the sheave surfaces 21*a*, 22*a*, 31*a*, 32*a*. That is, the belt 40 used for the CVT 5 may be a steel band belt or a chain belt.

In the CVT 5, when the widths of the V-grooves of the pulleys 20, 30 are changed, a ratio between a radius of the belt 40 wound around the primary pulley 20 (hereinafter referred to as a "primary-side belt winding radius") and a radius of the belt 40 wound around the secondary pulley 30 (hereinafter referred to as a "secondary-side belt winding radius") changes continuously. That is, a transmission ratio γ of the CVT 5 can change continuously.

Further, when a speed control to change the transmission ratio γ of the CVT 5 is performed, a hydraulic pressure in the first hydraulic chamber 23 on the primary side is controlled so as to change the belt winding radiuses of the pulleys 20, 30, and a hydraulic pressure in the second hydraulic chamber 33 on the secondary side is controlled so as to control a belt clamping pressure of the CVT 5 to an appropriate magnitude. The belt clamping pressure is a force to clamp the belt 40 from both sides in the axial direction by the sheave surface 21*a*, 31*a* on a fixed side and the sheave surface 22*a*, 32*a* on a moving side in each pulley 20, 30. When the belt clamping pressure is controlled to an appropriate magnitude, an optimum frictional force is generated between the V-grooves of the pulleys 20, 30 and the belt 40, so that a belt tension between the pulleys 20, 30 is secured. A power changed in the CVT 5 is output from the output gear 7 rotating together with the output shaft 6 in an integrated manner.

The output gear 7 meshes with a counter driven gear 8*a* of the counter gear mechanism 8. That is, a gear pair is formed by the output gear 7, which is a drive gear, and the counter driven gear 8*a*, which is a driven gear. The counter gear mechanism 8 is a deceleration mechanism configured such that the counter driven gear 8*a*, a counter drive gear 8*b*, and a counter shaft 8*c* rotate together in an integrated manner. The counter drive gear 8*b* meshes with a differential ring gear 9*a* of the differential mechanism 9. Right and left driving wheels 11, 11 are connected to the differential mechanism 9 via right and left axles 10, 10.

In the power transmission mechanism thus configured, the fixed sheaves 21, 31 of the CVT 5 are placed at diagonal positions (on opposite sides in the axial direction across the belt 40 and on different axes). Accordingly, the belt 40 moves to the same direction along the axial direction relative to the fixed sheaves 21, 31 at the time of a change gear operation. Hereby, misalignment of the belt 40 should be restrained. However, the misalignment of the belt 40 might occur geometrically (details thereof will be described later with reference to FIGS. 2 and 3). In view of this, in the present embodiment, in order to restrain the misalignment of the belt 40, a moving apparatus 100 (described later more specifically with reference to FIG. 4) that can move the pair of secondary bearings 61, 62 supporting the secondary pulley 30 is provided. By changing a relative positional relationship between the fixed sheave 21 of the primary pulley 20 and the fixed sheave 31 of the secondary pulley 30 by the moving apparatus 100, it is possible to restrain the misalignment of the belt 40 and to secure durability of the belt 40, thereby restraining an increase of power loss. That is, the moving apparatus 100 is configured to change the relative positional relationship, so that a misalignment amount δ of the belt 40 is reduced.

Note that, as illustrated in FIG. 1, the moving apparatus 100 includes a first moving apparatus 100A configured to move one secondary bearing 61, and a second moving apparatus 100B configured to move the other secondary bearing 62. Since the moving apparatuses 100A, 100B have the same configuration, they are described as the moving apparatus 100 when they are not particularly distinguished. Further, when the pair of secondary bearings 61, 62 are not particularly distinguished, they are described as the secondary bearing 60.

Figure 2:
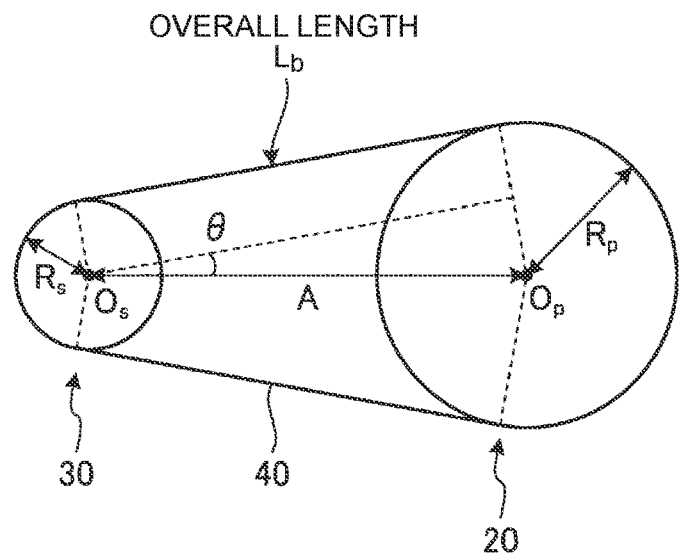
FIG. 2 is a view to describe an overall length of a belt.
Figure 3:
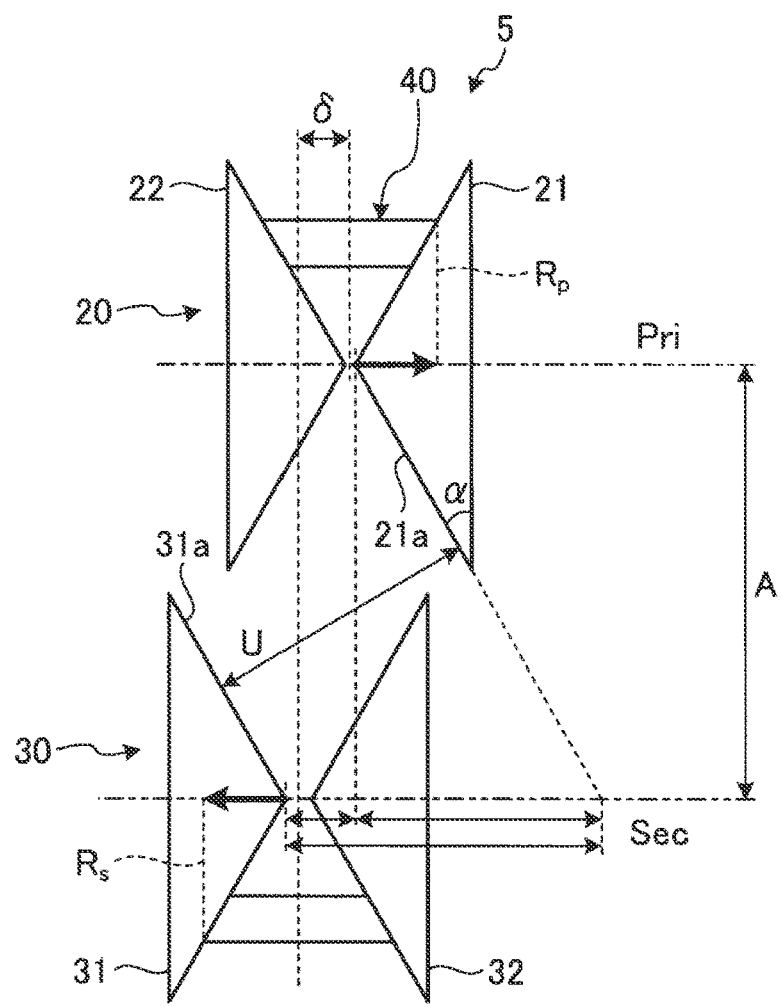
FIG. 3 is a view to describe a misalignment amount of the belt.

Referring to FIGS. 2, 3, the misalignment of the belt 40 is described. The misalignment of the belt 40 (hereinafter just referred to as the "misalignment") indicates that an axial center position of the belt 40 sandwiched by the V-groove of the primary pulley 20 deviates in the axial direction from an axial center position of the belt 40 sandwiched by the V-groove of the secondary pulley 30. One of the reasons to cause the misalignment is that the overall length (the belt length) of the belt 40 is unchangeable.

FIG. 2 is a view to describe the overall length of the belt 40. As illustrated in FIG. 2, the overall length (hereinafter referred to as the "belt length") $L_b$ of the belt 40 is expressed as a sum of a part wound around the primary pulley 20, a part wound around the secondary pulley 30, and linear parts between the pulleys 20, 30. That is, the belt length $L_b$ can be expressed by Expression (1).

$$L_b = 2A + (\pi + 2\theta)R_p + (\pi - 2\theta)R_s \qquad (1)$$

Here, A indicates a shaft-to-shaft distance between the primary shaft 20a and the secondary shaft 30a. θ indicates a bite angle of the belt 40. $R_p$ indicates the primary-side belt winding radius (a primary-side belt pitch radius). $R_s$ indicates the secondary-side belt winding radius (a secondary-side belt pitch radius). Note that the shaft-to-shaft distance A is a distance between a rotation center $O_p$ of the primary shaft 20a and a rotation center $O_s$ of the secondary shaft 30a.

In the CVT 5, although the belt length $L_b$ is uniform, a change amount of the primary-side belt winding radius $R_p$ does not just become a change amount of the secondary-side belt winding radius $R_s$, at the time of the change gear operation. More specifically, the change amount of the belt winding radius is smaller in a large-diameter side than in a small-diameter side. Accordingly, when the CVT 5 performs the change gear operation from a speed-up state (γ<1), the change amount of the primary-side belt winding radius $R_p$ becomes smaller than the change amount of the secondary-side belt winding radius $R_s$. In the meantime, when the CVT 5 performs the change gear operation from a slowing-down state (γ>1), the change amount of the secondary-side belt winding radius $R_s$ becomes smaller than the change amount of the primary-side belt winding radius $R_p$. When such a difference in the change amount of the belt winding radius occurs between the primary side and the secondary side, a difference occurs between an axial moving amount of the moving sheave 22 on the primary side and an axial moving amount of the moving sheave 32 on the secondary side. This causes the primary side and the secondary side to have different axial center positions (centers in the belt width) of the belt 40, which changes the misalignment amount δ.

FIG. 3 is a view to describe the misalignment amount δ of the belt 40. The misalignment amount δ can be expressed by Expression (2).

$$\delta = \frac{U}{\cos\alpha} - A\tan\alpha + (R_p + R_s)\tan\alpha - B_e \qquad (2)$$

In Expression (2), δ indicates a misalignment amount of the belt 40 per transmission ratio γ. U indicates a surface-to-surface orthogonal distance (hereinafter referred to as a "sheave-surface-to-sheave-surface distance") between the sheave surface 21a of the fixed sheave 21 of the primary pulley 20 and the sheave surface 31a of the fixed sheave 31 of the secondary pulley 30. α indicates a sheave angle (an inclination angle of the sheave surface 21a, 22a, 31a, 32a). $B_e$ indicates a width (an axial length) of the belt 40. Further, "U/cos α − A tan α" indicates an axial distance between the fixed sheaves 21, 31. "$(R_p+R_s)$tan α" indicates an axial moving amount of the belt 40 along with the change of the belt winding radius.

While the belt winding radiuses of the pulleys 20, 30 are variable, there is a constraint that the belt length $L_b$ is unchangeable. In terms of the constraint, when Expression (1) is solved, the primary-side belt winding radius $R_p$ can be expressed as Expression (3).

$$R_p = \frac{\sqrt{\pi^2 A^2 (1+\gamma)^2 + 4A(1-\gamma)^2(L_b - 2A)} - \pi A(1+\gamma)}{2(1-\gamma)^2} \qquad (3)$$

In the present embodiment, in order to reduce the misalignment amount δ expressed by Expression (2), the moving apparatus 100 is configured to change the shaft-to-shaft distance A. Further, the moving apparatus 100 is configured to move the secondary shaft 30a on a predetermined circular orbit, so that a meshing error does not occur in a meshing portion between the output gear 7 and the counter driven gear 8a due to the change of the shaft-to-shaft distance A. An example of the circular orbit is illustrated in FIG. 4.

Figure 4:
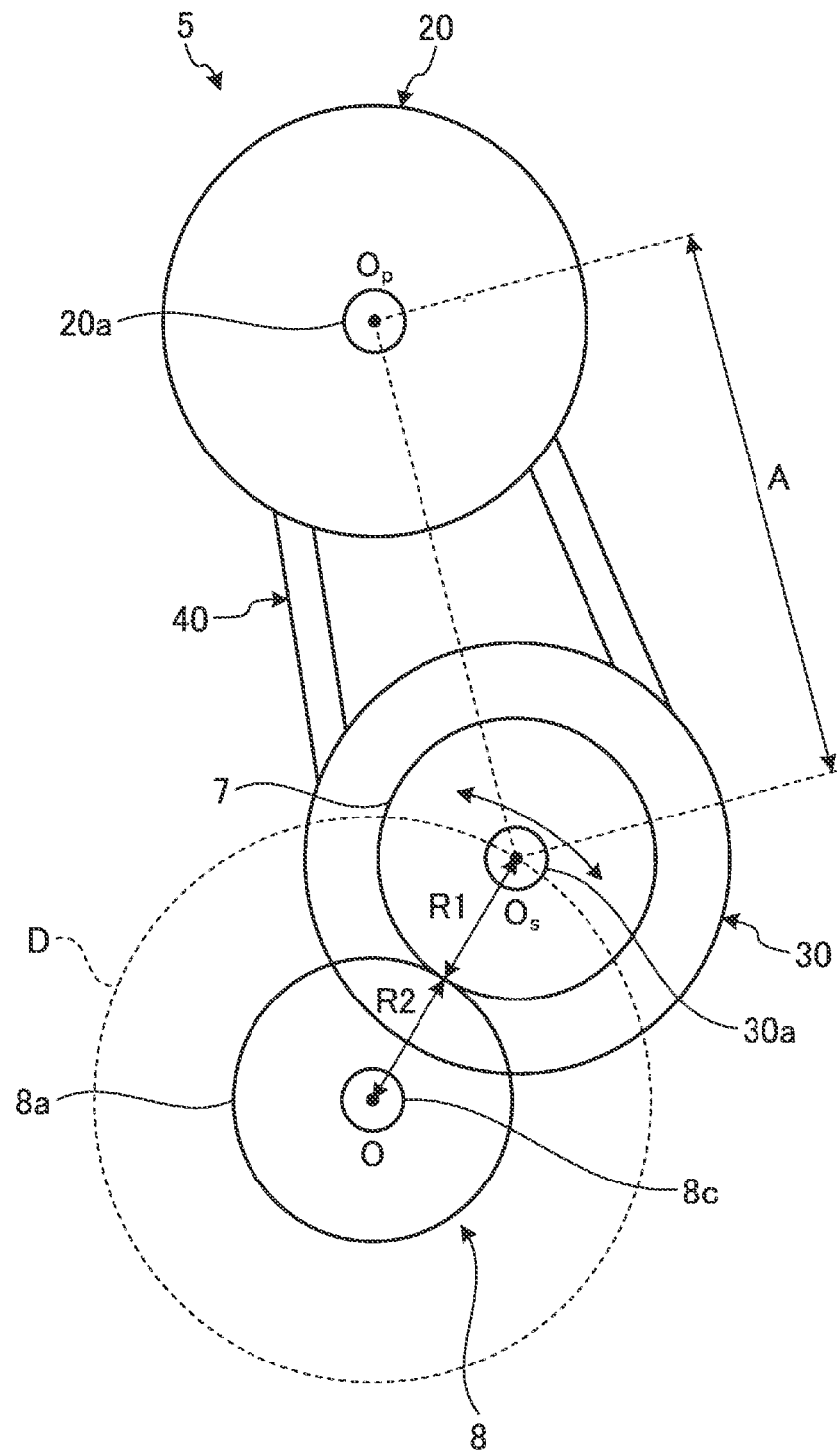
FIG. 4 is a view to describe a circular orbit.

FIG. 4 is a view to describe a circular orbit. As illustrated in FIG. 4, a circular orbit D is a circular orbit around a rotation center O of the counter driven gear 8a. That is, a radius of the circular orbit D is equal to a sum of a pitch radius R1 of the output gear 7 and a pitch radius R2 of the counter driven gear 8a.

The secondary shaft 30a is moved so that a position of a rotation center Os of the secondary shaft 30a is displaced on the circular orbit D by the moving apparatus 100. By moving the position of the rotation center Os of the secondary shaft 30a on the circular orbit D, it is possible to restrain an occurrence of a meshing error in the meshing portion between the output gear 7 and the counter driven gear 8a. Further, the moving apparatus 100 causes the secondary shaft 30a to reciprocate so as to draw a locus of a predetermined arc on the circular orbit D. Note that, in a case where the secondary shaft 30a is moved, the position of the primary shaft 20a is fixed.

Figure 5:
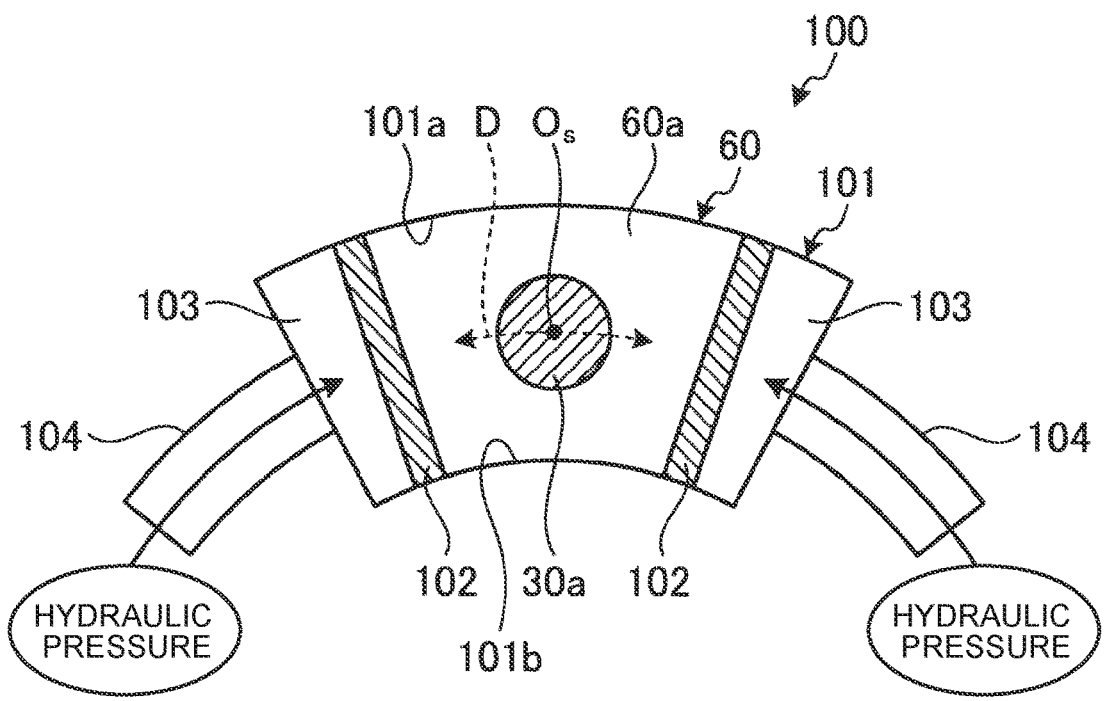
FIG. 5 is a view schematically illustrating an example of a moving apparatus.

FIG. 5 is a view schematically illustrating an example of the moving apparatus 100. As illustrated in FIG. 5, the moving apparatus 100 is a hydraulic actuator configured to apply a hydraulic pressure to the secondary bearing 60 from both sides in a circumference direction of the circular orbit D, so that the secondary bearing 60 and the secondary shaft 30a can reciprocate integrally on the circular orbit D.

The moving apparatus 100 includes a cage 101 having a hollow shape in which the secondary bearing 60 is accommodated, pistons 102 configured to press the secondary bearing 60 inside the cage 101, hydraulic chambers 103 formed inside the cage 101, and oil passages 104 configured to supply a hydraulic pressure to the hydraulic chambers 103.

The cage 101 is a fixed member having a hollow shape and fixed to the case, and the outer race 60a of the secondary bearing 60 is accommodated therein in a movable state on the circular orbit D. As illustrated in FIG. 5, the cage 101 includes an outer guide portion 101a and an inner guide portion 101b formed in an arc shape along a circle concentric to a center (the rotation center O of the counter driven gear 8a) of the circular orbit D. Similarly to the cage 101, a shape of the outer race 60a of the secondary bearing 60 is formed in an arc shape along the circle concentric to the center of the circular orbit D. In a state where the secondary bearing 60 is accommodated in the cage 101, the secondary bearing 60 is movable in the circumferential direction of the circular orbit D, but is not movable in a radial direction of the circular orbit D.

The pistons 102 are provided in the cage 101 so as to be placed on both sides of the secondary bearing 60 in the circumference direction of the circular orbit D. The piston 102 is configured to be slidable on an inner surface (the outer guide portion 101a and the inner guide portion 101b) of the cage 101 in a state where the piston 102 seals the cage 101 with respect to the hydraulic chamber 103.

The hydraulic chambers 103 are provided on both sides of the secondary bearing 60 in the circumference direction of the circular orbit D, and are connected to a hydraulic circuit (not shown) via respective oil passages 104. Further, the hydraulic pressure of the hydraulic chamber 103 is controlled by an electronic control unit (not shown) provided in the vehicle Ve to a hydraulic pressure corresponding to the transmission ratio γ of the CVT 5. As described above, the misalignment amount δ changes according to the transmission ratio γ of the CVT5, so that the hydraulic chamber 103 is controlled to a hydraulic pressure with a magnitude that can reduce the misalignment amount δ according to the transmission ratio γ. The piston 102 is pushed by the hydraulic pressure of the hydraulic chamber 103 controlled as such so as to give a force (a moving force) in the circumferential direction of the circular orbit D to the secondary bearing 60 and the secondary shaft 30a. Note that, since the circumference direction of the circular orbit D extends in a direction perpendicular to the axial direction of the secondary shaft 30a, a force in the direction perpendicular to the axial direction of the secondary shaft 30a is applied to the secondary bearing 60 and the secondary shaft 30a from the moving apparatus 100.

Further, when the hydraulic pressure control of the hydraulic chamber 103 is performed in conjunction with gear shifting of the CVT 5 at the time of the gear shifting, the speed control can be performed in conjunction with a shaft-to-shaft distance control. For example, by supplying a part of the hydraulic pressure discharged from the first hydraulic chamber 23 or the second hydraulic chamber 33 of the CVT 5 to the hydraulic chamber 103 of the moving apparatus 100 at the time of the gear shifting, it is possible to perform the hydraulic pressure control in conjunction therewith.

As described above, according to the present embodiment, it is possible to change the shaft-to-shaft distance A between the primary shaft 20a and the secondary shaft 30a by the moving apparatus 100. Accordingly, the shaft-to-shaft distance A can be changed to a distance that can reduce the misalignment amount δ expressed by Expression (2), thereby making it possible to restrain misalignment in the CVT 5.

Further, an angular difference may not be provided between the primary shaft 20a and the secondary shaft 30a, unlike the conventional configuration, thereby making it possible to restrain a decrease of durability of the belt 40 and an increase of power loss in the CVT 5. Further, since the secondary shaft 30a is moved by the moving apparatus 100 on the circular orbit D, it is possible to restrain an increase of the meshing error in the meshing portion between the output gear 7 and the counter driven gear 8a. Hereby, when the secondary shaft 30a moves, it is possible to restrain the increase of power loss that increases the meshing error of the gear pair. Accordingly, it is possible to restrain the misalignment and to restrain the decrease of durability and the increase of power loss.

Note that the present disclosure is not limited to the above embodiment, and can be changed appropriately without departing from the object of the present disclosure.

For example, the moving apparatus 100 is not limited to the configuration illustrated in FIG. 5. Modifications of the moving apparatus 100 are illustrated in FIGS. 6 and 7.

Figure 6:
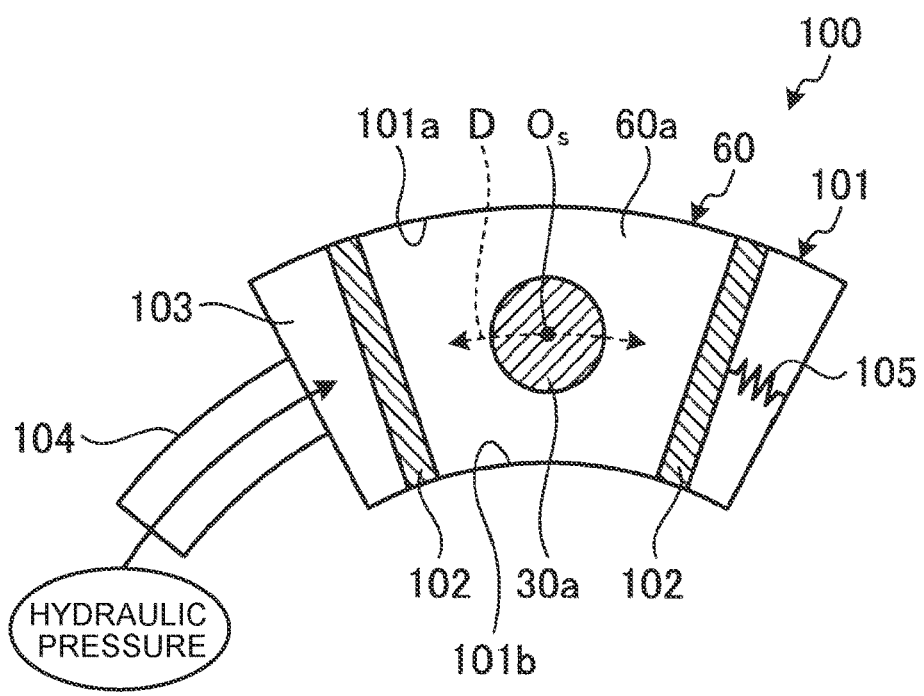
FIG. 6 is a view schematically illustrating a modification of the moving apparatus.

FIG. 6 is a view schematically illustrating a modification of the moving apparatus 100. As illustrated in FIG. 6, in a moving apparatus 100 of the modification, a hydraulic chamber 103 is provided only on one side of a secondary bearing 60 in a circumference direction of a circular orbit D, and a spring 105 is provided on the other side. The spring 105 is placed inside a cage 101 and is sandwiched between an inner wall surface of the cage 101 and a piston 102 in the circumference direction of the circular orbit D. A biasing force in a direction returned to a position on the hydraulic chamber 103 side in the circumference direction of the circular orbit D is applied to the secondary bearing 60 from the spring 105. As such, only one hydraulic chamber 103 should be provided inside the cage 101, so that a hydraulic pressure control of the hydraulic chamber 103 according to a transmission ratio γ becomes simple. Further, one oil passage 104 should be provided, so the structure becomes also simple. Note that, although not illustrated in the figure, a spring that applies a biasing force in the circumferential direction of the circular orbit D may be provided inside the hydraulic chamber 103. In this case, it is possible to apply the biasing forces of the springs to the secondary bearing 60 from both sides in the circumference direction of the circular orbit D. Accordingly, it is possible to balance (position) the secondary shaft 30a on the circular orbit D by the biasing forces of two springs.

Figure 7:
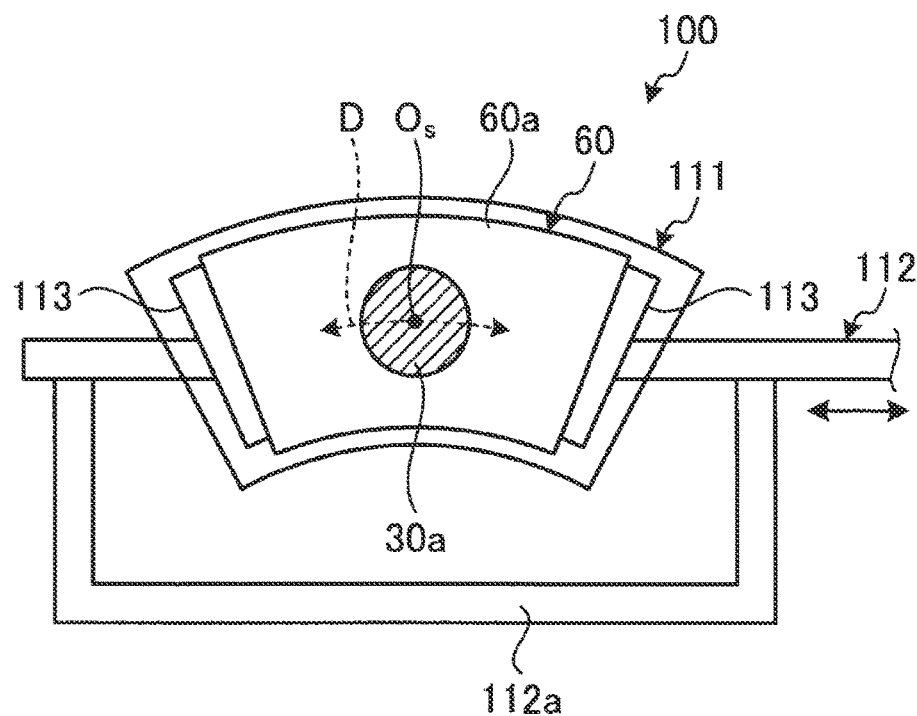
FIG. 7 is a view schematically illustrating another modification of the moving apparatus.
Figure 8:
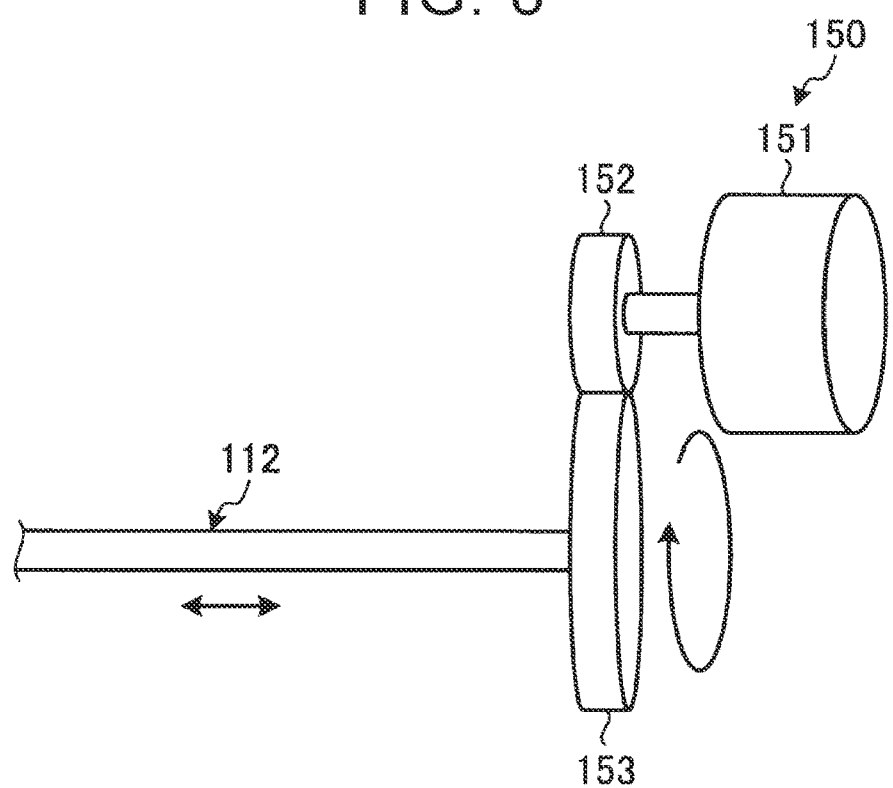
FIG. 8 is a view schematically illustrating a driving device of the moving apparatus illustrated in FIG. 7.

FIG. 7 is a view schematically illustrating another modification of the moving apparatus 100. FIG. 8 is a view schematically illustrating a driving device of the moving apparatus 100 illustrated in FIG. 7. As illustrated in FIG. 7, the moving apparatus 100 of another modification includes a cage 111, a feed screw 112, and support portions 113 attached to a tip end of the feed screw 112. A through-hole through which the feed screw 112 penetrates is provided in a wall portion of the cage 111. The tip end of the feed screw 112 is placed inside the cage 111, so as to be operated by a driving device 150 (illustrated in FIG. 8). The support portions 113 are placed on both sides of a secondary bearing 60 in a circumference direction of a circular orbit D. The support portion 113 is provided with a guide groove formed in a coupling portion with the tip end of the feed screw 112, so as to convert a force of the feed screw 112 in the axial direction into a force in the circumference direction of the circular orbit D. Further, the feed screw 112 is provided with a U-shaped arm portion 112a. Hereby, it is possible to give forces to the secondary bearing 60 from the feed screw 112 toward both sides in the circumference direction of the circular orbit D. Further, as illustrated in FIG. 8, the driving device 150 of the moving apparatus 100 is an electric actuator and is configured to transmit a power of the electric motor 151 to the feed screw 112 via a reduction gear pair constituted by a reduction gear 152 and a driven gear 153. As such, since the moving apparatus 100 is constituted by the electric actuator using the reduction gear pair, it is possible to highly precisely position the position of the secondary shaft 30a on the circular orbit D.

Figure 9:
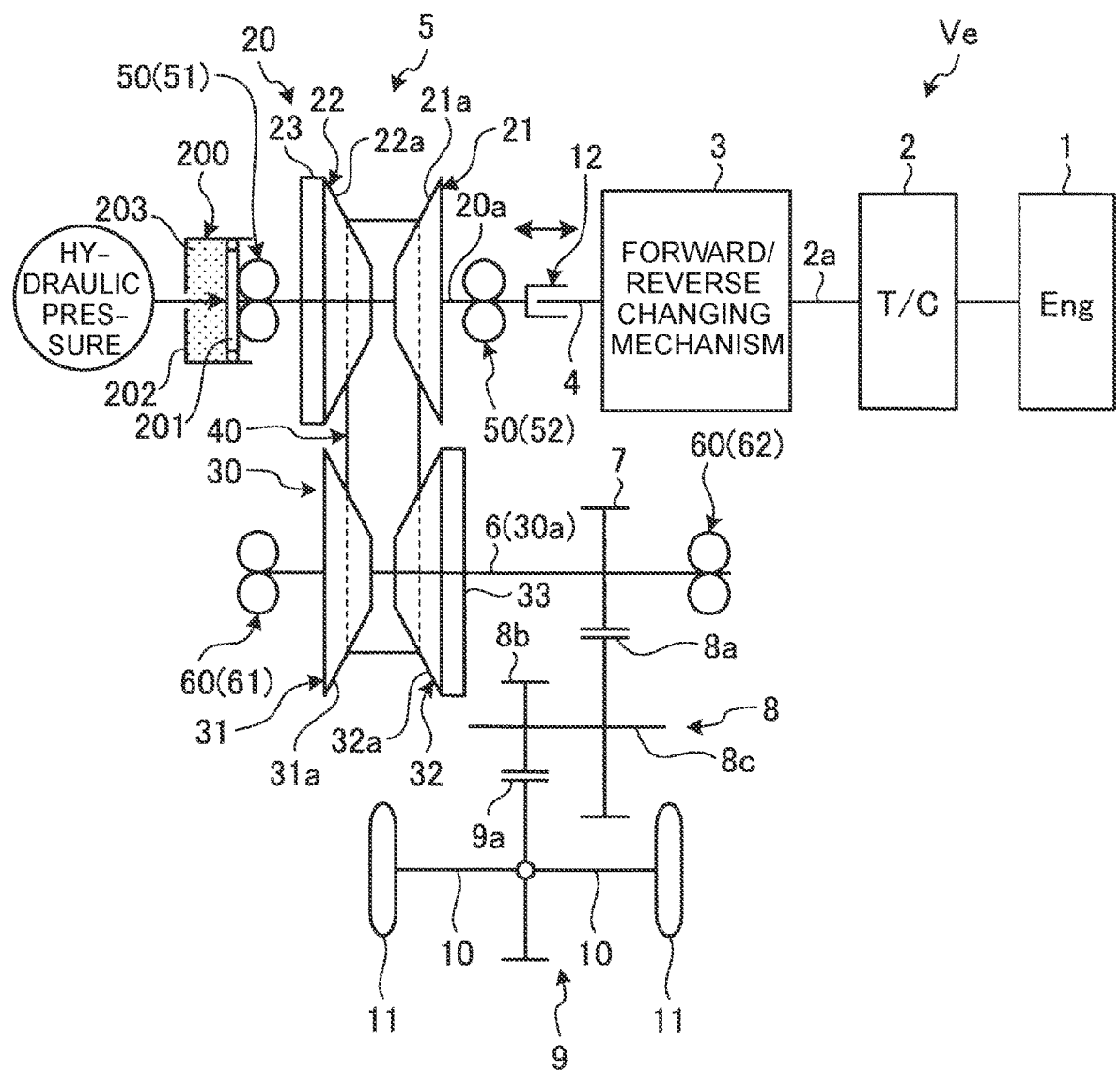
FIG. 9 is a view schematically illustrating an example of the moving apparatus provided on a primary shaft side.

Further, the moving apparatus is not limited to the configuration that can move the secondary shaft 30a, but may be configured to move the primary shaft 20a. In short, the moving apparatus may be configured to move the secondary shaft 30a or the primary shaft 20a in a predetermined direction if the shaft-to-shaft distance A expressed by Expression (2) or the sheave-surface-to-sheave-surface distance U is changeable. An example of a moving apparatus 200 configured to move a primary shaft 20a is illustrated in FIG. 9. Note that, in the description referring to FIG. 9, a description about the configuration similar to the configuration described above is omitted, and the same reference sign is used.

FIG. 9 is a view schematically illustrating an example of the moving apparatus 200 provided on the primary pulley 20 side. First, in a CVT 5 of the example illustrated in FIG. 9, the primary shaft 20a is formed as a different member from an input shaft 4. The input shaft 4 and the primary shaft 20a are connected (splined) by a spline portion 12 in an integrally rotatable manner. One primary bearing 51 is configured to be pushed in an axial direction toward a forward/reverse changing mechanism 3 side (the primary pulley 20 side) by a hydraulic pressure of the moving apparatus 200.

More specifically, the moving apparatus 200 includes a piston 201 configured to push the one primary bearing 51, a cylinder 202 in which the piston 201 is provided, and a hydraulic chamber 203 in which the cylinder 202 is provided. A hydraulic pressure is supplied to the hydraulic chamber 203 from a hydraulic circuit (not shown). That is, the moving apparatus 200 is a hydraulic actuator and is configured to move the primary shaft 20a in the axial direction by the hydraulic pressure. Further, an axial moving amount of the primary shaft 20a can be absorbed by the spline portion 12. That is, even if the primary shaft 20a is displaced in the axial direction, the displacement does not affect the input shaft 4 side. Accordingly, a position of a fixed sheave 21 on the primary side is displaced in the axial direction, so as to change a sheave-surface-to-sheave-surface distance U between the fixed sheaves 21, 31 of pulleys 20, 30. This makes it possible to reduce a misalignment amount δ corresponding to a transmission ratio γ. Note that, in a case where the primary shaft 20a is moved, a position of a secondary shaft 30a is fixed.

Note that the present disclosure is not limited to the above embodiment, and can be changed appropriately without departing from the object of the present disclosure. For example, the CVT may include both the moving apparatus 100 and the moving apparatus 200, so that the primary shaft and the primary bearing supporting the primary shaft, and the secondary shaft and the secondary bearing supporting the secondary shaft may be moved integrally by the moving apparatus 100 and the moving apparatus 200.

What is claimed is:

1. A continuously variable transmission comprising:
a primary pulley including a first fixed sheave fixed to a primary shaft, and a first moving sheave rotating together with the primary shaft in an integrated manner and relatively movable in an axial direction;
a secondary pulley including a second fixed sheave fixed to a secondary shaft, and a second moving sheave rotating together with the secondary shaft in an integrated manner and relatively movable in the axial direction;
a metal transmission belt wound around the primary pulley and the secondary pulley, the metal transmission belt being configured to continuously change a transmission ratio by continuously changing a width of a belt winding groove of the primary pulley and a width of a belt winding groove of the secondary pulley; and
a moving apparatus configured to integrally move either the primary shaft and a primary bearing supporting the primary shaft or the secondary shaft and a secondary bearing supporting the secondary shaft such that a relative positional relationship between the first fixed sheave and the second fixed sheave changes, the moving apparatus being configured to change the relative positional relationship such that a misalignment amount of the transmission belt is reduced;
wherein the relative positional relationship is determined by a shaft-to-shaft distance between the primary shaft and the secondary shaft, and
wherein when the moving apparatus integrally moves the secondary bearing and the secondary shaft, the moving apparatus is configured to move the secondary bearing and the secondary shaft in an orthogonal direction to the axial direction of the secondary shaft by giving a force in the orthogonal direction to the secondary bearing such that the shaft-to-shaft distance changes,
the continuously variable transmission further comprising:
a drive gear configured to rotate together with the secondary shaft in an integrated manner; and
a driven gear meshing with the drive gear,
wherein when the moving apparatus integrally moves the secondary bearing and the secondary shaft, the moving apparatus is configured to move the secondary bearing and the secondary shaft to reciprocate with a predetermined arc on a circular orbit around a rotation center of the driven gear such that a position of a rotation center of the secondary shaft is displaced on the circular orbit,
wherein a radius of the circular orbit is equal to a sum of a pitch radius of the drive gear and a pitch radius of the driven gear,
wherein the secondary bearing is a rolling bearing having an outer race,
wherein the moving apparatus includes a cage, and
wherein the cage is a fixed member having a hollow shape and accommodates the outer race inside the hollow in a movable state on the circular orbit.

2. The continuously variable transmission according to claim 1, wherein:
the moving apparatus includes a hydraulic actuator; and
the moving apparatus is configured to integrally move either the primary shaft and the primary bearing supporting the primary shaft or the secondary shaft and the secondary bearing supporting the secondary shaft.

3. The continuously variable transmission according to claim 1, wherein:
the moving apparatus includes a feed screw and a driving device; and
the moving apparatus is configured to integrally move the secondary shaft and the secondary bearing supporting the secondary shaft when a power of the driving device is transmitted to the feed screw.

4. The continuously variable transmission according to claim 1, wherein:
the moving apparatus is configured to integrally move either the primary shaft and the primary bearing supporting the primary shaft or the secondary shaft and the secondary bearing supporting the secondary shaft when the transmission ratio is changed.

5. A continuously variable transmission comprising:
a primary pulley including a first fixed sheave fixed to a primary shaft, and a first moving sheave rotating together with the primary shaft in an integrated manner and relatively movable in an axial direction;
a secondary pulley including a second fixed sheave fixed to a secondary shaft, and a second moving sheave rotating together with the secondary shaft in an integrated manner and relatively movable in the axial direction;
a metal transmission belt wound around the primary pulley and the secondary pulley, the metal transmission belt being configured to continuously change a transmission ratio by continuously changing a width of a belt winding groove of the primary pulley and a width of a belt winding groove of the secondary pulley; and
a moving apparatus configured to integrally move at least one of a first member supporting the primary shaft and a second member supporting the secondary shaft such that a relative positional relationship between the first fixed sheave and the second fixed sheave changes, the first member being the primary shaft and a primary bearing, the second member being the secondary shaft and a secondary bearing, the moving apparatus being configured to change the relative positional relationship such that a misalignment amount of the transmission belt is reduced;
wherein the relative positional relationship is determined by a shaft-to-shaft distance between the primary shaft and the secondary shaft, and
wherein when the moving apparatus integrally moves the secondary bearing and the secondary shaft, the moving apparatus is configured to move the secondary bearing and the secondary shaft in an orthogonal direction to the axial direction of the secondary shaft by giving a force in the orthogonal direction to the secondary bearing such that the shaft-to-shaft distance changes,
the continuously variable transmission further comprising:
a drive gear configured to rotate together with the secondary shaft in an integrated manner; and
a driven gear meshing with the drive gear,
wherein when the moving apparatus integrally moves the secondary bearing and the secondary shaft, the moving apparatus is configured to move the secondary bearing and the secondary shaft to reciprocate with a predetermined arc on a circular orbit around a rotation center of the driven gear such that a position of a rotation center of the secondary shaft is displaced on the circular orbit,
wherein a radius of the circular orbit is equal to a sum of a pitch radius of the drive gear and a pitch radius of the driven gear,
wherein the secondary bearing is a rolling bearing having an outer race,
wherein the moving apparatus includes a cage, and
wherein the cage is a fixed member having a hollow shape and accommodates the outer race inside the hollow in a movable state on the circular orbit.

* * * * *